Nov. 20, 1962  J. MÜLLER  3,064,749
SUSPENSION FOR DRIVEN SWINGING HALF-AXLES
Filed Dec. 7, 1959  2 Sheets-Sheet 1
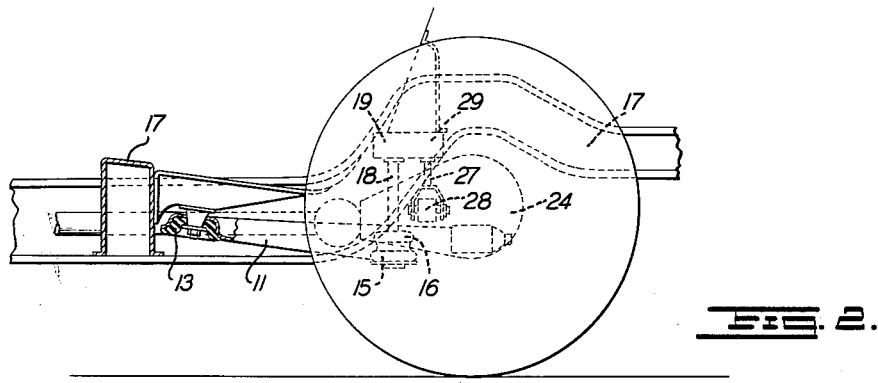
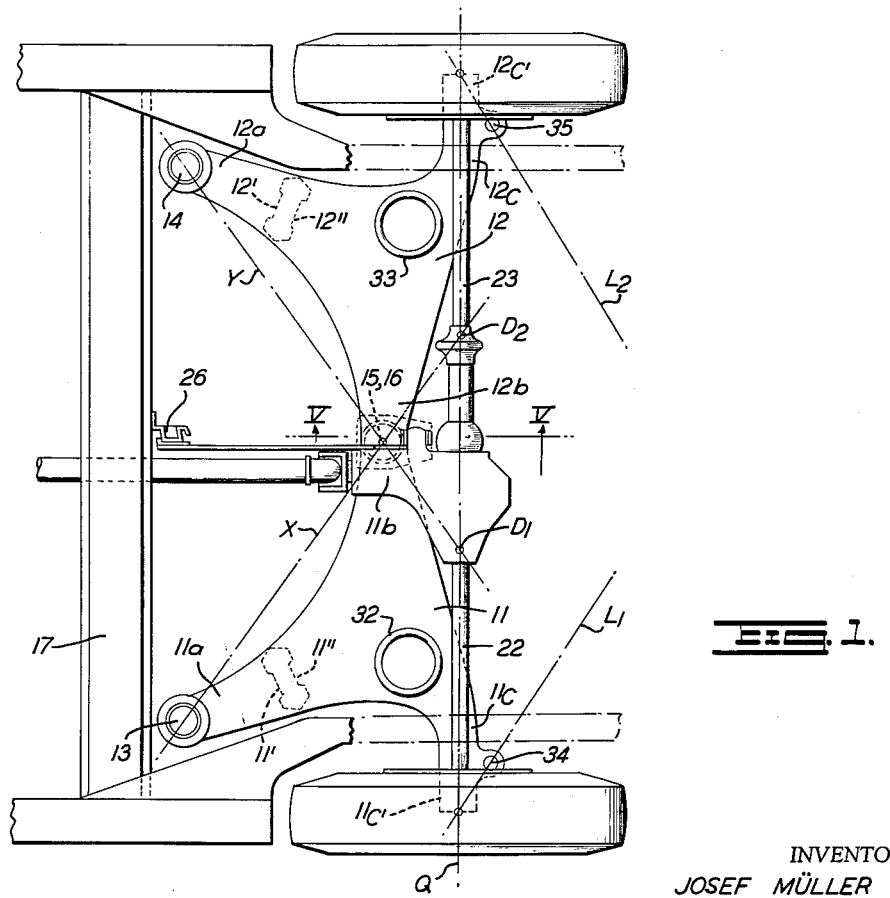
INVENTOR
JOSEF MÜLLER
BY
ATTORNEY Nov. 20, 1962
J. MÜLLER
3,064,749
SUSPENSION FOR DRIVEN SWINGING HALF-AXLES
Filed Dec. 7, 1959
2 Sheets-Sheet 2
FIG. 3.
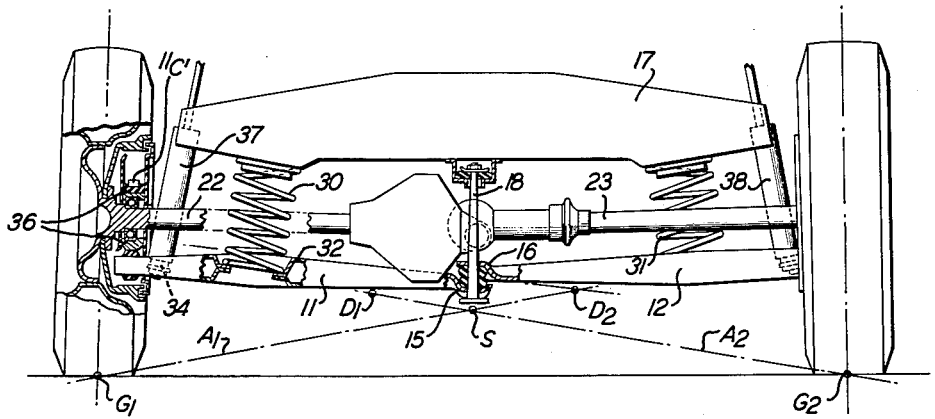
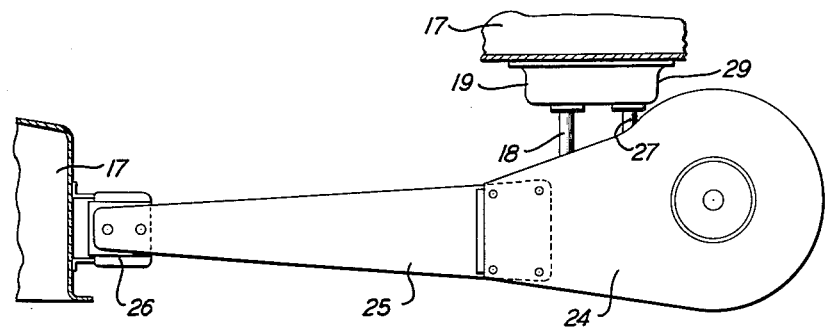
FIG. 4.
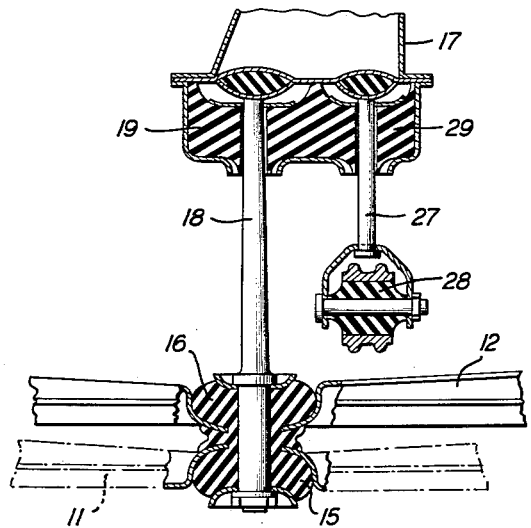
FIG. 5.
INVENTOR
JOSEF MÜLLER
BY
*Dicke, Craig & Freudenberg*
ATTORNEY United States Patent Office 3,064,749
Patented Nov. 20, 1962

3,064,749
SUSPENSION FOR DRIVEN SWINGING
HALF-AXLES
Josef Müller, Stuttgart-Riedenberg, Germany, assignor to Daimler-Benz Aktiengesellschaft, Stuttgart-Unterturkheim, Germany
Filed Dec. 7, 1959, Ser. No. 857,754
Claims priority, application Germany Dec. 13, 1958
18 Claims. (Cl. 180—73)

The present invention relates to a driven vehicle axle, especially a rear axle for motor vehicles, provided with wheel suspension members swingingly arranged independently of one another and with jointed half-shafts adapted to oscillate in the transverse direction of the vehicle and driving the vehicle wheels which half-shafts in turn are driven by means of an axle gear.

Motor vehicles with so called swinging of half-axle members used as driven rear axles are known in the prior art. By reason of the relatively slight sensitivity of these swinging or half-axle members as regards curve-tilting by reason of a favorable support effect in combination with a simple construction obtainable therewith, the same are particularly suitable for rear axles.

The rear axle constructions of the prior art have oftentimes the following construction: jointed half-shafts constituting the drive shafts for the vehicle wheels are rotatably supported within two hollow half-axles extending in the transverse direction of the vehicle which half-shafts are movably connected with each other in the center thereof by means of a common joint and carry at the outer ends thereof the vehicle wheels, whereby the half-shafts, in turn, are driven from an axle gear, for example, from a differential gear. The axle gear housing is thereby rigidly connected with one half axle. A suitable structural part arranged at this joint and provided with an upwardly extending bolt member serves the purposes of securing the entire rear axle unit at the vehicle superstructure such as the frame. Additionally, the transversely extending half-axles are braced in proximity to the vehicle wheels against the vehicle superstructure by means of thrust or tension members extending in the longitudinal direction of the vehicle.

The type of construction of a driven rear axle described hereinabove, though causing relatively small changes in wheel tread and camber angle as a result of the single-joint construction which entails a longer swinging radius, however, offers relatively large unsprung masses.

With other half-axle constructions of the prior art, the axle gear is secured at the vehicle frame or superstructure and the tubular half-axle members are each swingingly connected by means of a suitable joint with the axle gear housing which, in that case, simultaneously therewith has to transmit to the vehicle superstructure the thrust forces and braking moments. This, in turn, requires an extremely sturdy and therewith very heavy construction of the axle gear housing. Furthermore, during spring movements of the vehicle wheels, relatively large changes in tread and camber angle occur with such an arrangement. Additionally, two-jointed half-axles, i.e., half-axles provided with two joints have a relatively high instantaneous center disposed above the axle center. This entails in a disadvantageous manner a large change in the wheel loads during tilting of the vehicle superstructure or body while driving through curves which in turn entails a reduction of the lateral guidance of the wheel suspension.

On the other hand, rear axle constructions, so called De-Dion axle constructions are known in the prior art in which the vehicle wheels which are driven by divided joint-shafts having two joints are connected with each other by means of a rigid axle. The axle gear is thereby secured at the vehicle frame. While this axle construction has the advantage of a reduced unsprung mass, it nevertheless entails all of the disadvantages normally encountered with a rigid axle construction.

The present invention is concerned with the task to provide a driven axle, especially a driven rear axle, by means of which the disadvantages occurring in the known axle constructions are avoided whereby an improved driving characteristic and roadability of the vehicle results therefrom.

For solving the problems encountered with the basic aim of the present invention, it is proposed in accordance therewith to movably connect each vehicle wheel of the axle preferably by means of one wheel guide member each with the vehicle superstructure such as the frame in such a manner that the swinging or pivot axes of the wheel guide members are directed obliquely, in case of a rear axle, from a point located forwardly outwardly inwardly toward the rear of the vehicle. Additionally, the wheel guiding members according to the present invention extend with a downward inclination, and intersect or cross each other ahead of the wheel or axle transverse plane in which the driving shafts are disposed, whereby the axle gear is secured at the vehicle separately from the wheel suspension, either at the vehicle frame or a part of the frame, or at the vehicle body of a self-supporting type vehicle structure.

According to one feature of the present invention it is proposed to movably connect the two wheel guiding members with the vehicle by means of one forwardly and outwardly arranged bearing each and by means of one additional rearwardly disposed bearing each, the latter being located essentially in the vehicle center longitudinal plane, whereby the two inwardly arranged bearings of the two wheel guiding members are disposed directly one above the other or one directly below the other or coincide theoretically.

In order to eliminate, minimize, or at least dampen the short vibrations and high frequency swinging movements which are produced in particular by specially shaped road unevennesses and surface characteristics or by special road characteristics which cause the disagreeable body droning produced thereby, all of the bearings by means of which the wheel guiding members and the axle gear is connected with the vehicle superstructure are constructed advantageously as elastic bearings.

According to a further feature of the present invention, it is proposed to construct each of the wheel guiding members within the region of the vehicle wheel in the form of an annulus within which is elastically supported the wheel end of the drive shaft together with the bearings theerof. As a result of such an arrangement, the relative movements occurring during spring movements between the respective guide member and the corresponding drive shaft are thereby movably and elastically absorbed.

Accordingly, it is an object of the present invention to provide an independent wheel suspension for driven wheels which avoids the disadvantages normally encountered in connection with the prior art, independent wheel suspensions used for driven wheels.

It is another object of the present invention to provide a swinging half-axle construction for the driven wheels of a vehicle which reduces the unsprung mass as much as possible, improves the roadability, and minimizes any substantial shifts in the loads from one wheel to the other while traveling through curves.

Still another object of the present invention resides in the provision of a swinging half-axle construction for driven wheels of a vehicle which provides a relatively low instantaneous center and favorable absorption of the forces emanating from the wheels.

Still another object of the present invention resides in the provision of a swinging half-axle construction for the driven wheels of a vehicle which effectively prevents the transmission to the vehicle superstructure of high frequency vibrations and swinging movements from the road and at the same time minimize any droning caused thereby in the vehicle body.

Another object of the present invention is the provision of a vehicle swinging axle construction for driven wheels in which the forces are reliably and effectively absorbed without requiring particularly sturdy parts which would otherwise increase the weight of the suspension.

These and other objects, features and advantages of the present invention will become more obvious from the following description when taken in connection with the accompanying drawing which shows, for purposes of illustration only, one embodiment in accordance with the present invention, and wherein:

FIGURE 1 is a top plan view of a rear axle construction for a motor vehicle in accordance with the present invention, FIGURE 2 is a side elevational view of the rear axle construction of FIGURE 1, FIGURE 3 is a rear elevational view of the rear axle construction illustrated in FIGURE 1, with parts thereof broken away for clarity's sake, FIGURE 4 is a partial side elevational view, on an enlarged scale, illustrating the arrangement and bearing support of the axle gear at the vehicle superstructure in accordance with the present invention, and FIGURE 5 is a cross-sectional view, on an enlarged scale, taken along line V—V of FIGURE 1 and illustrating one construction of the elastic bearing in accordance with the present invention.

The term "vehicle superstructure" is used in the present application to designate any relatively fixed vehicle part such as the vehicle frame, chassis frame, or vehicle body of a self-supporting type body construction.

Referring now to the drawing wherein like reference numerals are used throughout the various views to designate like parts, reference numerals 11 and 12 generally designate the wheel guide members which have an approximately triangular shape provided with curved sides. The two wheel guide members 11 and 12 are elastically connected with the vehicle superstructure such as the vehicle frame 17 by means of a forwardly and outwardly disposed elastic bearing 13 and 14, respectively, and by means of one inwardly disposed elastic bearing 15 and 16, respectively (FIGURES 1, 2, 3 and 5). The connection of the forward ends 11a and 12a of the wheel guide members 11 and 12 with the vehicle superstructure such as the vehicle frame 17 takes place directly by means of bearings 13 and 14, respectively, whereas the inwardly directed ends 11b and 12b of the wheel guide members 11 and 12 are operatively connected with the vehicle superstructure by means of a suspension bolt member 18 with the aid of bearings 15 and 16, respectively. The upper end of the suspension bolt member 18 is connected with the vehicle superstructure such as the frame 17 also by means of an elastic bearing 19 (FIGURE 5). The lateral ends 11c and 12c of the two wheel guide members 11 and 12 are constructed in the form of an annulus 11c' (FIGURE 3) and 12c' which simultaneously therewith movably accommodate, within small limits, the bearing supports of the drive shafts 22 and 23 at the ends thereof near the vehicle wheels by means of elastic members 36.

The housing 24 of the axle gear which may be a differential gear is provided with a forwardly extending projection 25 (FIGURES 1 and 4). The forward end of the projection 25 is directly secured at the vehicle superstructure such as the frame 17 by means of a laterally disposed, elastically constructed bearing 26 whereas the transmission housing 24 is indirectly connected with the vehicle superstructure such as the vehicle frame 17 over a suspension bolt member 27, by means of a lower elastic bearing 28 and by means of an upper elastic bearing 29. The two bearings 19 and 29 may thereby be combined structurally, as illustrated in FIGURE 5.

The two wheel guiding members 11 and 12 each consist of two pressed sheet-metal parts 11', 11" and 12', 12", respectively, which are joined, for example, by welding in a box-shaped manner. The lower ends of the spring elements, for example, of coil springs 30 and 31 abut in corresponding recesses 32 and 33 provided within the wheel guiding members 11 and 12.

As will become more clear particularly from FIGURES 1 and 2 of the drawing, each of the two wheel guiding members 11 and 12 together with the respective bearing supports 13 or 14 and 15 or 16 effectively form a statically determined two-jointed arc. The two wheel guiding members with their outer bearing supports 13 and 14 and the center support, bearings 15 and 16, together form a three-jointed arc. The pivot axes X and Y of the wheel guiding members 11 and 12 extend obliquely from the front toward the rear and extend also with a downward inclination so that the theoretical length of a swinging half-axle becomes effectively greater than would be the case with a pure swinging half-axle, properly speaking as known in the prior art, which undergo swinging movements exactly in the transverse direction. This entails the advantage that the changes in the wheel tread and camber angle resulting from the spring movements of the wheels become still smaller than with so called pure swinging half-axles, properly speaking. Furthermore, the theoretical support point S forming the instantaneous center is disposed lower than with the so called pure swinging half-axles, properly speaking. A relatively low instantaneous center offers the advantage over a relatively high instantaneous center that the changes in the wheel load of one axle-half caused by tilting of the vehicle body while driving through curves is smaller with a relatively low instantaneous center than with a relatively high instantaneous center. Generally speaking, a wheel-load shift or displacement always has the effect of a reduction in the lateral guidance, i.e., the more the wheel disposed along the outer side of the curve is loaded by the centrifugal forces, with respect to the wheel disposed along the inner side of the curve, the more there exists the danger that the axle breaks out and thereby endangers the lateral guidance of the vehicle. In contrast thereto, the slight disadvantages which are encountered with an extremely low, rear instantaneous center may be corrected by artifically raising the instantaneous center of the front axle; for determinative of the behavior of the vehicle body in the curve is the position and direction of the transverse stabilizing axis, i.e., of the connecting line of the instantaneous centers of the front and rear axles.

The support point S is disposed at the point of intersection of the two supporting lines $A_1$ and $A_2$ which represent the connection of the points of action of impacts $D_1$ and $D_2$ disposed in the transverse plane Q with the contact points of the wheels $G_1$ and $G_2$ with the road surface. The points $D_1$ and $D_2$ are caused by the shock or impact force of the swinging axes X and Y through the transverse plane Q.

Pivotal connecting places 34 and 35 are provided within the region of the lateral outer corners 11c and 12c of the wheel guiding members 11 and 12 for the lower ends of the hydraulic telescopic shock absorbers 37 and 38 (FIGURE 3) the extended longitudinal axes $L_1$ and $L_2$ of which intersect the vertical plane passing through the main axes of the vehicle wheels and extend parallel or approximately parallel with respect to the swinging axes X and Y of the individual wheel guiding members 11 and 12. Such an arrangement and position of the shock absorbers 37 and 38 entails an advantageous action of the forces and relatively favorable conditions of movements for the shock absorbers.

In addition to the advantages mentioned hereinabove the following are some further advantages which may be obtained by an axle construction in accordance with the present invention.

The axle construction in accordance with the present invention provides a separate suspension for the wheel guiding members and for the axle gear whereby the unsprung masses are reduced. Furthermore, an effective bracing or support of the lateral forces of the wheels together with an absorption of the thrust forces and braking moments only by the means of the two wheel guiding members is obtained in accordance with the present invention which form together a statically determined three-jointed arc. As compared to the classical or so called pure swinging half axle construction, theoretically a larger length of the swinging half axle and a lower support point or instantaneous center results from the oblique arrangement of the pivot axes, as viewed in plan view, and from the inclined arrangement thereof as viewed in elevational view. Furthermore, a countermoment is produced during braking by reason of the oblique positioning of the pivot axes which opposes nose diving during braking. Additionally, the concept of the axle construction in accordance with the present invention entails an extremely low construction for the entire rear axle so that the vehicle body inner space and the luggage compartment may be constructed of relatively larger space and both of these internal spaces are not disturbed or impaired by any upwardly extending structural parts with the exception of the shock absorbers extending upwardly close to the lateral walls thereof.

Finally, by reason of the elastic support in proximity to and for the vehicle wheels by means of the annular construction of the wheel guide members adjacent the wheels within which are arranged the ends adjacent the wheels of the drive shaft and bearings therefor, an elastic absorbing member is interposed already between the outer end of the wheel guiding member and the source of swinging movements, namely the vehicle wheel so that the vehicle floor sensitive to droning noises and the vehicle body are insulated in a twofold manner with respect to the road, namely once, by the aforementioned means and, on the other hand, by the direct or indirect elastic bearing of the wheel guiding members and axle gear housing at the vehicle superstructure by means of bolt members 18 and 27.

While I have shown and described one embodiment in accordance with the present invention it is understood that the same is not limited thereto but is susceptible of many changes and modifications within the spirit and scope of the present invention, and I, therefore, do not wish to be limited to the details shown and described herein but intend to cover all such changes and modifications as are encompassed by the scope of the appended claims.

I claim:

1. A driven rear axle construction for oppositely disposed wheels of a motor vehicle having a vehicle superstructure, comprising axle gear means, jointed drive shaft means operatively connecting said axle gear means with a respective wheel to thereby drive the same, wheel guiding means for each vehicle wheel including separate, forwardly disposed bearing means and common inwardly disposed bearing means for guidingly supporting each wheel at said vehicle superstructure, said wheel guiding means being so constructed and arranged that the pivot axis of a respective wheel guiding means extends obliquely with respect to the vehicle longitudinal direction and at an inclination with respect to a horizontal plane and that the effective pivot axes of said wheel guiding means cross each other in a vertical transverse plane of the vehicle spaced forwardly at a distance spaced in the longitudinal direction of the vehicle from the vertical transverse plane in which said drive shaft means are located, means independent of said wheel guiding means for supporting said axle gear means at said vehicle superstructure, said forwardly disposed bearing means being directly connected with said superstructure, and separate means for suspending said common bearing means from said superstructure.

2. A driven axle construction according to claim 1, wherein said common bearing means are so arranged that the theoretical pivot points effectively coincide with one another.

3. A driven axle construction according to claim 2, wherein all of said bearing means for both of said wheel guiding means are constructed elastically.

4. A driven axle construction according to claim 1, wherein each wheel guiding means is of approximately T-shape and is guided in a two-jointed arc pivotally secured at the ends by a respective one of said forwardly disposed bearing means and said common inwardly disposed bearing means, said two wheel guiding means being guided in a three-jointed arc pivotally secured at the ends by said forwardly disposed bearing means and in the center by said common bearing means.

5. A driven axle construction according to claim 1, wherein said wheel guiding means are box-shaped in cross-section and are composed of an upper and a lower pressed sheet-metal part joined along the edges thereof.

6. A driven axle construction according to claim 1, wherein said wheel guiding means are provided with outwardly directed corners in proximity to the vehicle wheels, and telescopic hydraulic shock absorber means pivoted to said corners and operatively connecting said wheel guiding means with said vehicle superstructure.

7. A driven axle construction according to claim 6, wherein the axes of said shock absorber means intersect a vertical plane through the main wheel axes of the wheels and extend essentially parallel to said effective pivot axes of said wheel guiding means.

8. A driving axle construction for oppositely disposed wheels of a motor vehicle having a vehicle superstructure, comprising axle gear means, jointed drive shaft means operatively connecting said axle gear means with a respective wheel to thereby drive the same, wheel guiding means for each vehicle wheel including separate, forwardly disposed bearing means and common inwardly disposed bearing means for guidingly supporting each wheel at said vehicle superstructure, said wheel guiding means being so constructed and arranged that the pivot axis of a respective wheel guiding means extends obliquely with respect to the vehicle longitudinal direction and at an inclination with respect to a horizontal plane and that the effective pivot axes of said wheel guiding means cross each other at a distance spaced in the longitudinal direction from the plane in which said drive shaft means are located, means independent of said wheel guiding means for supporting said axle gear means at said vehicle superstructure, said forwardly disposed bearing means being directly connected with said superstructure, and separate means including a connecting bolt member for suspending said common bearing means from said vehicle superstructure.

9. A driven axle construction according to claim 8, further comprising elastic bearing means for elastically connecting also the upper end of said bolt member at said vehicle frame.

10. A driven axle construction for oppositely disposed wheels of a motor vehicle having a vehicle superstructure, comprising axle gear means having a projection extending essentially in the vehicle longitudinal direction, drive shaft means operatively connecting said axle gear means with a respective wheel to thereby drive the same, means including independent wheel guiding means for each vehicle wheel for guidingly supporting each wheel at said vehicle superstructure, said last-mentioned means being so constructed and arranged that the pivot axis of a respective wheel guiding means extends obliquely with respect to the vehicle longitudinal direction and also at an inclination with respect to a horizontal plane and that the effective pivot axes of said wheel guiding means cross each other at a distance spaced in the longitudinal direction from the plane in which said drive shaft means are located, and means independent of said wheel guiding means for elastically supporting said axle gear means including elastic bearing means for elastically supporting the free end of said projection on said vehicle superstructure and separate suspension means for elastically supporting said axle gear means at said vehicle superstructure within the region opposite to said free end, said separate suspension means comprising a bolt member elastically connected at the upper end with said vehicle superstructure, said elastic bearing means elastically connecting the lower end of said bolt member with said axle gear means within said opposite region.

11. A driven axle construction according to claim 10, wherein said means for guidingly supporting each wheel at said vehicle superstructure includes common bearing means for both of said independent wheel guiding means, and wherein the bearing means elastically connecting the lower end of said suspension bolt member is arranged at a distance in the vehicle longitudinal direction from said common bearing means.

12. A driven axle construction according to claim 11, wherein said bearing means elastically connecting the lower end of said suspension bolt member with said axle gear means is disposed relatively higher than said common bearing means.

13. A driven axle construction for oppositely disposed wheels of a motor vehicle having a vehicle superstructure, comprising axle gear means, jointed drive shaft means operatively connecting said axle gear means with a respective wheel to thereby drive the same, wheel guiding means for each vehicle wheel including separate, forwardly disposed bearing means and common inwardly disposed bearing means for guidingly supporting each wheel at said vehicle superstructure, said wheel guiding means being so constructed and arranged that the pivot axis of a respective wheel guiding means extends obliquely with respect to the vehicle longitudinal direction and at an inclination wtih respect to a horizontal plane and that the effective pivot axes of said wheel guiding means cross each other at a distance spaced in the longitudinal direction from the plane in which said drive shaft means are located, means independent of said wheel guiding means for supporting said axle gear means at said vehicle superstructure, said forwardly disposed bearing means being directly connected with said superstructure, separate means indirectly connecting said common bearing means with said superstructure, said means independent of said wheel guiding means for supporting said axle gear means at said vehicle superstructure including a downwardly directed bolt member, said separate means also including a downwardly directed bolt member, and elastic bearing means for the upper and lower ends of both of said bolt members, the elastic bearing means of the upper end of both of said bolt members being constructed as a combined single elastic bearing.

14. A driven rear axle construction for oppositely disposed wheels of a motor vehicle having a vehicle superstructure, comprising axle gear means, having a projection extending essentially in the vehicle longitudinal direction, jointed drive shaft means operatively connecting said gear means with a respective wheel to thereby drive the same, wheel guiding means for each vehicle wheel including separate, forwardly disposed bearing means and common inwardly disposed bearing means for guidingly supporting each wheel at said vehicle superstructure, said wheel guiding means being so constructed and arranged that the pivot axis of a respective wheel guiding means extends obliquely with respect to the vehicle longitudinal direction and at an inclination with respect to a horizontal plane and that the effective pivot axes of said wheel guiding means cross each other in a vertical transverse plane of the vehicle spaced forwardly at a distance in the longitudinal direction of the vehicle from the vertical transverse plane in which said drive shaft means are located, means independent of said wheel guiding means including elastic bearing means for supporting said axle gear means on said vehicle superstructure at both the free end of said projection as well as within the opposite region thereof, said forwardly disposed bearing means being directly connected with said superstructure, and separate means for suspending said common bearing means from said superstructure.

15. A driven axle construction according to claim 14, wherein the free end of said projection is essentially web-shaped, and wherein the elastic bearing means for said free end is arranged at the web-shaped portion of the free end of said projection.

16. A driven axle construction according to claim 14, wherein said means independent of said wheel guiding means includes separate suspension means for elastically supporting said axle gear at said vehicle superstructure within said opposite region.

17. A driven axle construction for oppositely disposed wheels of a motor vehicle having a vehicle superstructure, comprising axle gear means, jointed drive shaft means operatively connecting said axle gear means with a respective wheel to thereby drive the same, wheel guiding means for each vehicle wheel including separate, forwardly disposed bearing means and common inwardly disposed bearing means for guidingly supporting each wheel at said vehicle superstructure, said wheel guiding means being so constructed and arranged that the pivot axis of a respective wheel guiding means extends obliquely with respect to the vehicle longitudinal direction and at an inclination with respect to a horizontal plane and that the effective pivot axes of said wheel guiding means cross each other at a distance spaced forwardly in the longitudinal direction from the plane in which said drive shaft means are located, said wheel guiding means being provided with outwardly directed corners in proximity to the vehicle wheels, telescopic hydraulic shock absorber means pivoted to said corners and operatively connecting said wheel guiding means with said vehicle superstructure, the axes of said shock absorber means intersecting in a vertical plane through the main wheel axes of the wheels and extending essentially parallel to said effective pivot axes of said wheel guiding means, and means independent of said wheel guiding means for supporting said axle gear means at said vehicle superstructure, said forwardly disposed bearing means being directly connected with said superstructure.

18. A driven rear axle construction for oppositely disposed wheels of a motor vehicle having a vehicle superstructure, comprising axle gear means, jointed drive shaft means operatively connecting said axle gear means with a respective wheel to thereby drive the same, wheel guiding means for each vehicle wheel including separate, forwardly disposed bearing means and common inwardly disposed bearing means arranged below said forwardly disposed bearing means for guidingly supporting each wheel at said vehicle superstructure, said wheel guiding means being so constructed and arranged that the pivot axis of a respective wheel guiding means extends obliquely and inwardly with respect to the central vertical longitudinal plane of the vehicle and downwardly with respect to a horizontal plane extending through a respective forwardly disposed bearing means, the effective pivot axes of said wheel guiding means crossing each other at a distance in front of the vertical transverse plane of the vehicle in which said drive shaft means are located and below said common inwardly disposed bearing means, means independent of said wheel guiding means for supporting said axle gear means at said vehicle superstructure, said forwardly disposed bearing means being directly connected with said superstructure, and separate means for suspending said common bearing means from said superstructure.

References Cited in the file of this patent

UNITED STATES PATENTS

| | | |
|---|---|---|
| 2,635,704 | Herreshoff | Apr. 21, 1953 |
| 2,741,493 | Matthias | Apr. 10, 1956 |
| 2,757,747 | MacPherson | Aug. 7, 1956 |
| 2,806,713 | Muller | Sept. 17, 1957 |
| 2,815,084 | Fortgang et al. | Dec. 3, 1957 |
| 2,856,201 | Muller et al. | Oct. 14, 1958 |
| 2,906,572 | Wroby | Sept. 29, 1959 |
| 2,911,052 | Olley | Nov. 3, 1959 |